United States Patent [19]
Kühnhold et al.

[11] Patent Number: 5,499,884
[45] Date of Patent: Mar. 19, 1996

[54] HUB ATTACHMENT ASSEMBLY

[75] Inventors: Wolfgang Kühnhold, Neu-Isenburg; Rudolf Beier, Offenbach, both of Germany

[73] Assignee: Lohr & Bromkamp GmbH, Offenbach/Main, Germany

[21] Appl. No.: 27,375

[22] Filed: Mar. 8, 1993

[30] Foreign Application Priority Data

Mar. 12, 1992 [DE]   Germany ..................... 42 07 839.3

[51] Int. Cl.$^6$ .................. F16B 21/18; F16D 1/06; B23P 19/08
[52] U.S. Cl. .................. 403/359; 403/326; 403/327
[58] Field of Search .................. 403/359, 326, 403/327; 285/318, 321

[56] References Cited

U.S. PATENT DOCUMENTS

| | | | |
|---|---|---|---|
| 3,326,580 | 6/1967 | Munier et al. | 285/321 X |
| 3,832,076 | 8/1974 | Gehrke | 403/359 |
| 3,865,499 | 2/1975 | Flichy | 403/359 X |
| 3,992,117 | 11/1976 | Ristau | 403/359 X |
| 4,124,318 | 11/1978 | Sagady | 403/359 X |
| 4,240,654 | 12/1980 | Gladieux | 285/321 X |
| 4,261,668 | 4/1981 | Rigal | 403/359 X |
| 4,872,710 | 10/1989 | Konecny et al. | 285/321 X |
| 5,176,413 | 1/1993 | Westman | 285/321 |

FOREIGN PATENT DOCUMENTS

| | | |
|---|---|---|
| 2200453 | 4/1974 | France . |
| 2488968 | 2/1982 | France . |
| 3730200 | 7/1988 | Germany . |
| 4040337 | 6/1992 | Germany . |
| 1-39489 | 8/1989 | Japan . |
| 2-17728 | 4/1990 | Japan . |
| 855282 | 11/1960 | United Kingdom . |

Primary Examiner—Anthony Knight
Attorney, Agent, or Firm—Harness, Dickey & Pierce

[57] ABSTRACT

A hub attachment assembly has a driveshaft with external splines at its shaft end, a slide-on hub with a shaft bore with corresponding internal splines, and an axial securing mechanism in the form of a resilient snap ring. The snap ring engages opposed recesses in the two sets of splines to couple the two parts together.

16 Claims, 5 Drawing Sheets

HUB ATTACHMENT ASSEMBLY

BACKGROUND OF THE INVENTION

The invention relates to a hub attachment assembly. The assembly includes a driveshaft with external splines at its shaft end, a slide-on hub with a shaft bore having corresponding internal splines, and an axial securing mechanism. The axial securing mechanism includes a resilient snap ring which engages opposed recesses in the two sets of splines.

There exist several prior art designs of such assemblies, some of which will be described below by way of example. However, the art has specific disadvantages.

According to a first prior art design, a fixed radial stop shoulder is provided on the hub at the driveshaft towards the shaft shank. The hub, via an end face, is in contact with the stop shoulder. Axial fixing or attaching at the shaft end is effected by a securing element which engages an annular groove.

A problem with this design is the axial distance between the stop shoulder and recess has to be dimensioned very accurately. Thus, the tolerances of the axial length of the hub and of the thickness of the snap ring are taken into account. Furthermore, in the course of production, the axial length of the external splines at the driveshaft relative to the position of the stop shoulder is very accurately observed to ensure that the stop shoulder is not damaged. The internal splines in the hub, relative to the profile run-out at the driveshaft, must not extend over the entire length of its shaft bore.

According to a second prior art design with basically identical first and second stop means, it is proposed, as above, to insert an intermediate ring between the stop shoulder on the shaft and the hub. In this case, it is possible to reduce the problem of accurately dimensioning the profile run-out, which may axially extend beyond the length of the hub towards the shaft shank. A disadvantage is that it is necessary to provide an additional annular part. Thus, with respect to the axial distance between the annular shoulder and recess, further tolerances are taken into account.

Especially with cold-formed monoblock tubular shafts, the required stop shoulder is difficult to produce for the two above-mentioned designs. In the case of monoblock tubular shafts, it is necessary, for compensation purposes, to provide a material accumulation underneath the splines. The blank required for this purpose, with a variable wall thickness, is expensive to produce.

In the case of solid shafts, the height of the stop shoulder determines the diameter of the starting material. Thus, the shoulder defines the disadvantageous machining volume. Such recessed stop shoulders weaken the torque-loaded cross-section and, in addition, lead to an excessive stress level.

According to a third prior art design, a snap ring is provided which simultaneously engages corresponding annular grooves cut into the respective splines of the driveshaft and of the shaft bore of the hub. The disadvantage in this case refers to the notch effect relative to the driveshaft and hub, especially if, with reference to the axial length of the hub, the annular grooves are orientated towards the adjoining shaft shank and are thus, relative to the driveshaft, positioned in the region of torque flow. Furthermore, the assembling and dismantling operations are very complicated with these designs.

SUMMARY OF THE INVENTION

It is an object of the present invention to provide an assembly of the initially mentioned type which eliminates the hub stop shoulder. Also, the length of the splines does not have to meet any special tolerance requirements. At the same time, assembly is easy and the notch effect should not be excessively high.

A first solution in accordance with the invention includes a combination of the following features. A first recess is formed in the first of the two sets of splines. A snap ring form-fittingly engages the recess in a substantially axially clearance-free way. The snap ring is held in a self-inhibiting way when the shaft end and hub are axially loaded relative to one another so that the ring is prevented from leaving the first recess.

A run-on face is on the same of the two sets of splines. The run-on face is enveloped by a conical face. The opening angle of the conical face, relative to a rear flank of a second recess in the second of the two sets of splines, is so small that no self-inhibition occurs at the axially loaded snap ring when the shaft and hub are inserted into one another. The run-on face, with reference to the mutual engagement of the two sets of splines, is positioned in front of the first recess. The front annular edge of the run-on face, with reference to the mutual engagement of the two sets of splines, cuts more deeply into the first of the two sets of splines than the base of the first recess. Flanks are formed in the second recess in the second of the two sets of splines. The flank angles, relative to the flanks of the first recess, generate self-inhibition at the axially loaded snap ring. The depth of the second recess is dimensioned in such a way that the snap ring may enter this second recess if, with reference to the first of the two sets of splines, the ring is positioned between a rear annular edge of the run-on face and the adjoining shoulder line of the first recess.

It should be explained at this point, according to a first embodiment of the invention, that the first recess may be provided in the first of the two sets of splines at the driveshaft. Accordingly, the second recess may be provided in the second of the two sets of splines in the hub (see FIGS. 1, 2 and 3). In a kinematic reversal, the first recess is provided in the set of splines which is then the first of the two sets of splines in the hub, whereas the second recess is provided in the second of the two sets of splines on the shaft (see FIGS. 4, 5 and 6). The proposed method of assembling the above-mentioned assembly, which reveals essential advantages of the invention, includes the two splined parts inserted into one another. The snap ring, while axially supporting itself in the second recess in the part having the second of the two sets of splines, slides over the run-on face in the part with the first of the two sets of splines and engages the first recess.

In a first design, prior to axially inserting the two parts into one another, the snap ring, while being radially pretensioned, is applied to the part with the first of the two sets of splines directly in front of the front annular edge of the run-on face. Thus, the snap ring, via an undercut, is axially inserted into the part with the second of the two sets of splines into the second recess if, with reference to the mutual engagement of the two parts, it is positioned at the front of the respective part (see FIGS. 1, 2, 5 and 6).

In a second design, prior to axially inserting the two parts into one another, the snap ring is introduced radially, in a tension-free way, into the second recess in the part with the second of the two sets of splines. Thus, with reference to the mutual engagement of the two parts, the ring is positioned at the rear of the respective part (see FIGS. 3 and 4).

A second embodiment according to the invention includes a combination of the following features. A first recess is formed in the first of the two sets of splines. With reference to the mutual engagement of the two sets of splines, when the two sets of splines are axially loaded in the sense of being pulled apart, the snap ring rests against the front flank in a self-inhibiting way so that it is prevented from leaving the first recess.

A run-on face is on the same of the two sets of splines. The run-on face is enveloped by a conical face. The opening angle of the conical face, relative to the rear flank of a second recess in the second of the two sets of splines, is so small that no self-inhibition occurs at the axially loaded snap ring when the shaft and hub are inserted into one another. The run-on face, with reference to the mutual engagement of the two sets of splines, is positioned in front of the said first recess. The front annular edge, with reference to the mutual engagement of the two sets of splines, cuts more deeply into the first of the two sets of splines than the base of the first recess.

A front flank is in the second recess in the second of the two sets of splines. The flank angle, relative to a flank of the first recess, generates self-inhibition at the axially loaded snap ring when the shaft and hub are pulled apart. The depth of the second recess is dimensioned such that the snap ring may enter this second recess if, with reference to the first of the two sets of splines, the ring is positioned between a rear annular edge of the run-on face and adjoining shoulder line of the first recess. A third recess is formed in the first of the two sets of splines. The third recess form-fittingly accommodates a second snap ring in a substantially axially clearance-free way. The second ring, with reference to the mutual engagement of the splines, is arranged behind the run-on face and the first recess.

A turned end-face groove is formed in the part with the second of the two sets of splines. The second snap ring, with reference to the mutual engagement of the two sets of splines, axially contacts the end-face groove at the rear flank and radially contacts the circumferential face in a clearance-free way. Thus, further mutual engagement of the two parts is prevented.

In this case, it is possible for the first of the two sets of splines to be provided in the driveshaft and for the first and third recesses to be positioned in the tooth run-out (see FIG. 7). According to a further embodiment, it is possible for the first of the two sets of splines to be provided in the hub and for the first and third recesses, with reference to the mutual engagement of the two parts, to be arranged at the rear end of the hub (see FIG. 8). The region constituting the rear flank of the second recess, with reference to the mutual engagement of the two sets of splines, may preferably extend in the radial direction.

The method of assembling the last mentioned assemblies includes applying the first snap ring, while being radially pretensioned, to the part with the first set of splines directly in front of the front annular edge of the run-on face where the edge cuts most deeply into the first of the two sets of splines. The second snap ring, while being radially pretensioned, is inserted into the third recess. The two parts are inserted into one another. The first snap ring, while axially supporting itself in the second recess in the part with the second of the two sets of splines, slides over the run-on face in the part with the first of the two sets of splines and engages the first recess in the part having the first of the two sets of splines.

In a particularly advantageous embodiment, the part with the first set of splines is axially supported by an annular tool which directly supports the second snap ring which engages the third recess.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments will be explained below with reference to the drawings wherein.

DETAILED DESCRIPTION OF THE PREFERRED EMBODIMENTS

Figure 1A:
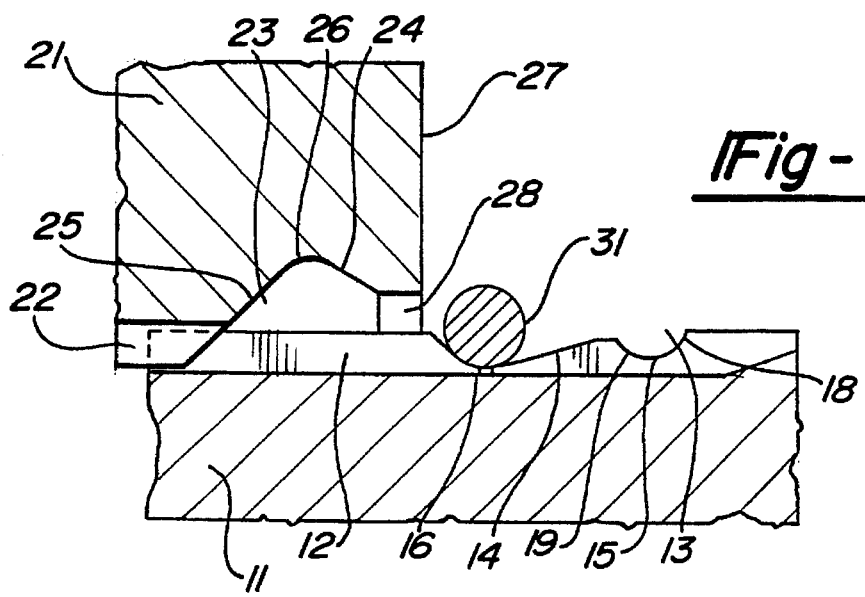
FIG. 1a is a cross sectional view of an assembly according to a first embodiment, with a first recess in the shaft at the end of the splines at the start of the assembly operation.

FIG. 1 shows the end of a shaft journal 11 including a first set of splines 12. At the end of the splines is a first recess 13. In front of recess 13 is a run-on face 14 which is limited by a conical face. The base of the recess 13 has been given the reference number 15. The continuous front annular edge of the inclined run-on face has been given the reference number 16. The diameter of the annular edge 16 of the inclined run-on face 14 is smaller than the base 15 of the annular groove 13.

The shaft end 11 is associated with a hub 21 which includes a second set of splines 22. At the front end of the hub 21, in the sense of mutual engagement, is a second recess 23 which is limited by a front flank 24 and a rear flank 25.

The base of the recess has been given the reference number 26. At the end face 27 of the hub 21, is a recess 28 having a connection to the recess 23. FIG. 1a shows a snap ring 31 prefitted under internal tension, via radial expansion caused by the shaft, at the start of the run-on face before the shaft 11 and the hub 21 are inserted into one another. As the process of mutual engagement continues, the ring 31 passes through the recess 28, enters the second recess 23 until it comes to rest against the rear flank 25. The ring 31, while expanding radially, is pushed over the inclined run-on face 14 until it engages the first recess 13. While being slid over the run-on face 14, the ring may slide along the rear flank 25 and may enter the second recess 23 without being obstructed by the base 26.

Figure 1B:
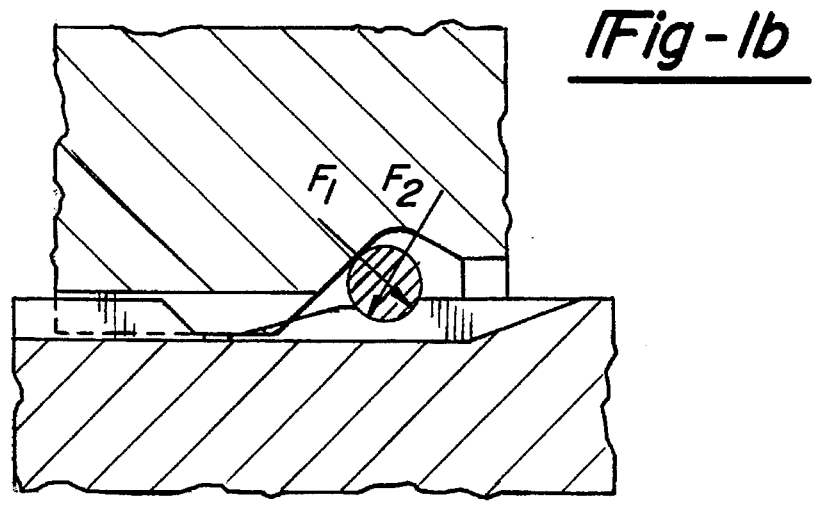
FIG. 1b is a cross sectional view of an assembly according to a first embodiment, with a first recess in the shaft at the end of the splines in the assembled condition.

FIG. 1b shows the finish-assembled condition. The angles of the flanks 24, 25 are such that the pressure forces $F_1$ prevent further engagement, while the pressure forces $F_2$ prevent dismantling because the angle of inclination of the flanks 18, 19 of the recess 13 is greater than the self-inhibition angle. Dismantling in the opposite direction is not possible unless the snap ring 31 is destroyed.

Figure 2A:
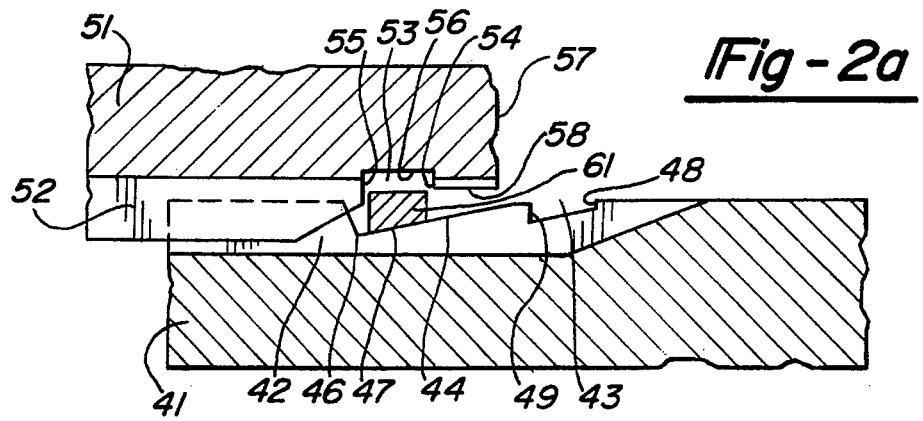
FIG. 2a is a cross sectional view of an assembly according to FIG. 1 with a modified version of the snap ring at the start of the assembly operation.
Figure 2B:
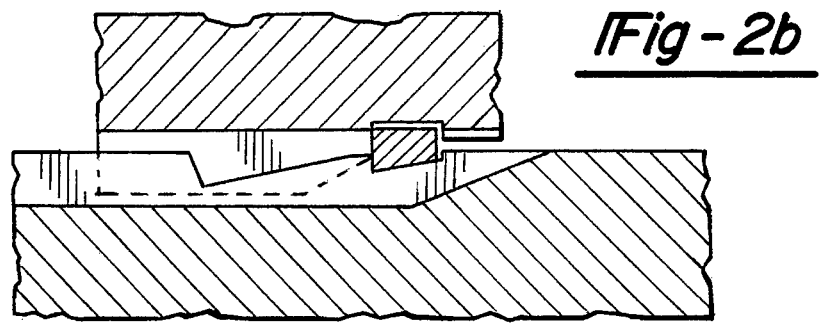
FIG. 2b is a cross sectional view of an assembly according to FIG. 1 with a modified version of the snap ring in the assembled condition.

In FIG. 2, details which correspond to those in FIG. 1 are given reference numbers increased by 30. In contrast to FIG. 1, the snap ring 61 has a quadrangular cross-section with an inner inclined face 47. Accordingly, the recess 43 radially includes extending front 48 and rear 49 flanks. The second recess 53 in the hub part 51 with the second set of splines 52 also includes radial front 54 and rear 55 flank. There is also an undercut 58 at the end face 57 of the hub.

In FIG. 2a, the snap ring 61 is again fitted in the region of the front annular edge 46 of the inclined run-on face 44. The hub 51 with its undercut 58 has already been slid over the snap ring 61 so that the snap ring 61 comes to rest against the rear flank 55 of the second recess 53. Subsequently, the ring slides over the inclined run-on face 44 while being radially expanded until it engages the first recess 43. The radial shape of the flanks of the first 43 and second recesses 53 prevent dismantling in a form-fitting way.

In FIG. 3, parts which correspond to those shown in FIG. 1 are given reference numbers increased by 60. FIG. 3 shows a shaft end 71 having a first set of splines 72 associated with a hub 81 having a second set of splines 82. The shapes of the first recess 73, the inclined run-on face 74 in the first set of splines 72 and the second recess 83 in the second set of splines 82 correspond to those shown in FIG. 1. However, the first recess 73 is arranged at the outer end of the first set of splines 72.

Figure 3A:
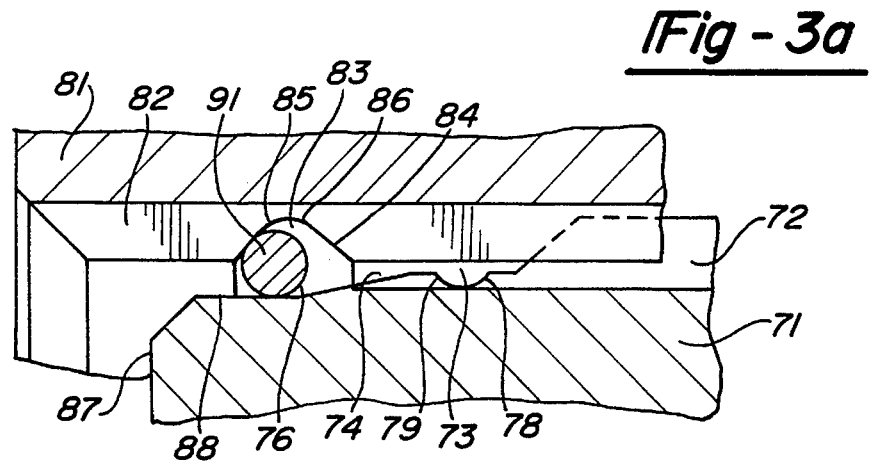
FIG. 3a is a cross sectional view of an assembly according to another embodiment with a first recess in the shaft in the vicinity of the shaft end at the start of the assembly operation.

In FIG. 3a, the snap ring 91 is pre-fitted in a tension-free way in the second recess 83 and slid on to the shaft end 71 as far as the front annular edge 76. The ring contacts the rear flank 85 of the second recess 83. The shaft end 71, following the front annular edge 76 of the inclined run-on face 74, as far as its end face 87 runs out in a cylindrical portion 88.

Figure 3B:
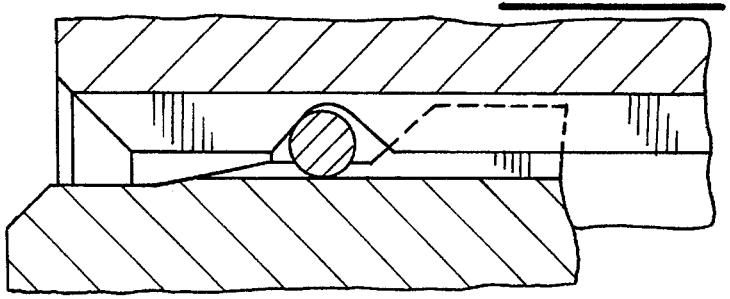
FIG. 3b is a cross sectional view of an assembly according to another embodiment with a first recess in the shaft in the vicinity of the shaft end in the assembled condition.

By being inserted further, the snap ring 91 expands in the same way as described in connection with FIG. 1. The ring is slid on to the run-on face 74 until it engages the annular groove 73. The flanks 78, 79 of the annular groove 73 are again positioned within the region of self-inhibition so that any dismantling from this position, as shown in FIG. 3b, cannot take place without destroying the snap ring.

In FIG. 4, details which correspond to those illustrated in FIG. 1 are given reference numbers increased by 90. It should be noted that in this case, the hub 111 is associated with the first set of splines 102 which include the respective details, especially the first recess 103 and the inclined run-on face 104. The shaft end 101 is associated with the second set of splines 112 with the second recess 113 and the respective details.

Figure 4A:
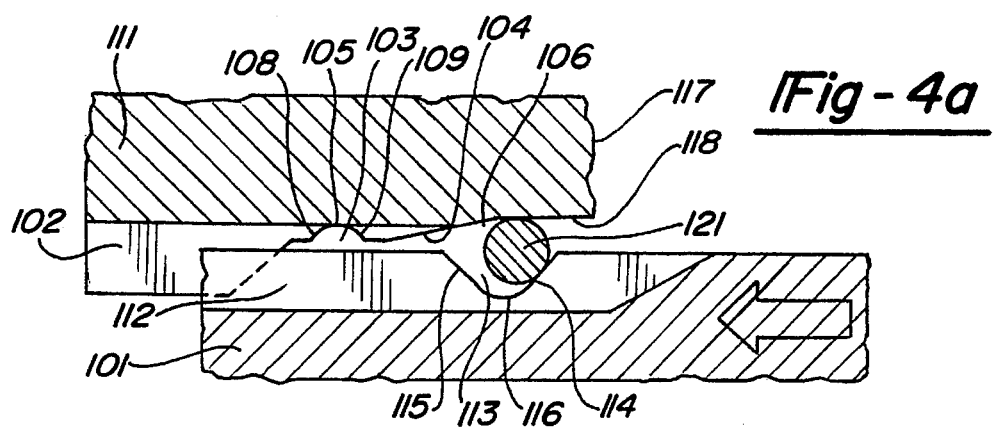
FIG. 4a is a cross sectional view of an assembly according to another embodiment with a first recess in the hub at the front end of the hub at the start of the assembly operation.
Figure 4B:
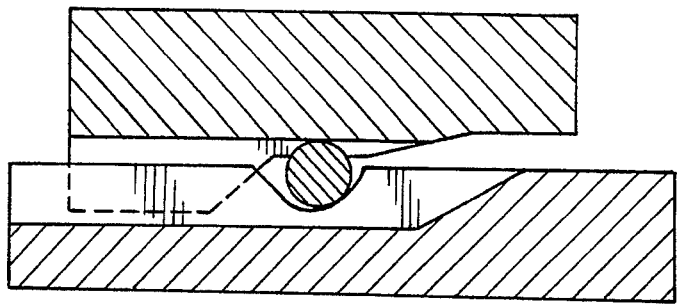
FIG. 4b is a cross sectional view of an assembly according to another embodiment with a first recess in the hub at the front end of the hub in the assembled condition.

In front of the front annular edge 106 in the hub there follows an internally cylindrical portion 118 which extends as far as the end face 117 of the hub 111. The second recess 113 in the second set of splines 112, at the shaft end 101 is positioned in the vicinity of the tooth run-out. As can be seen in FIG. 4a, the snap ring 121, prior to the two parts being inserted into one another, is introduced into the second recess 113 in a radially tension-free way. The base 116 of the recess 113 provides radial freedom to compress the snap ring when it slides along the run-on face 104 until it engages the first recess 103, which is illustrated in FIG. 4b. The snap ring in the recess 103 is supported on the flanks 108, 109 when, due to axial displacement, the flanks 114, 115 act on the snap ring 121 when subjected to axial loads.

Figure 5A:
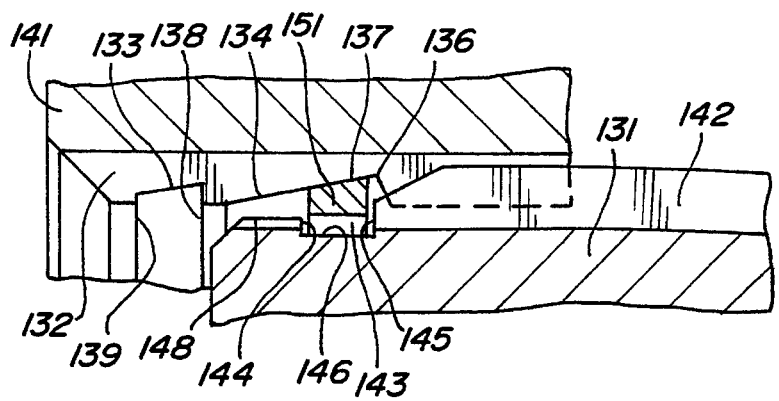
FIG. 5a is a cross sectional view of an assembly according to another embodiment with a first recess in the hub at the hub end facing the shaft end at the start of the assembly operation.
Figure 5B:
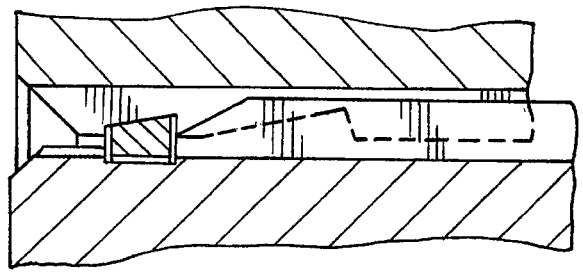
FIG. 5b is a cross sectional view of an assembly according to another embodiment with a first recess in the hub at the hub end facing the shaft end in the assembled condition.

In FIG. 5, details which correspond to those shown in FIG. 4 are given reference numbers increased by 30. In this case, the first set of splines 132 with the first recess 133 and the run-on face 134 are provided on the hub 141. The second set of splines 142 with the second recess 143 and the undercut 148, positioned in front, are arranged at the shaft end 131.

Similarly to what is shown in FIG. 2, the snap ring 151 includes an outer inclined face 137. As can be seen in FIG. 5a, the snap ring 151, while being radially pre-tensioned, is pre-fitted at the front diameter 136 of the run-on face 134. The shaft end is inserted into the hub so that the snap ring 151 slides over the undercut 148 and comes to rest against the rear flank 145 of the second recess 143. While being inserted further, the snap ring 141 is slid over the run-on face until it engages the first recess 133. In this position, with alternating axial loads, the snap ring alternatively rests against the flanks 138, 139 on both sides of the first recess in the hub 141 and also against the radial flanks 144, 145 of the second recess in the shaft end 131.

Figure 6A:
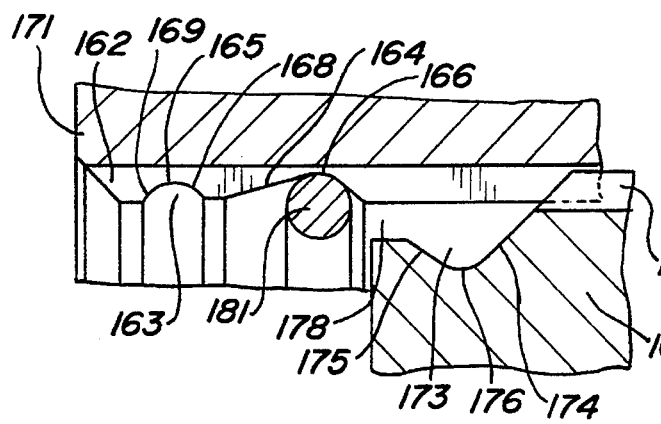
FIG. 6a is a cross sectional view of an assembly according to FIG. 5, with a modified cross-sectional shape of the snap ring at the start of the assembly operation.
Figure 6B:
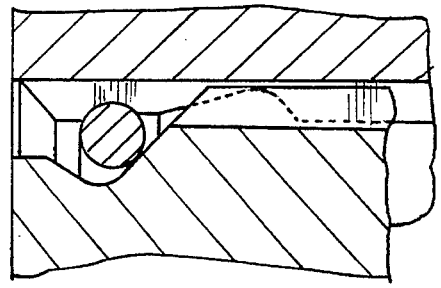
FIG. 6b is a cross sectional view of an assembly according to FIG. 5, with a modified cross-sectional shape of the snap ring in the assembled condition.

In FIG. 6, details which correspond to those illustrated in FIG. 4 are given reference numbers increased by 60. In this case, the shape of the first recess 163 in the first set of splines is substantially identical to that of the second recess 173 in the second set of splines 172. In contrast to FIG. 4, the second recess is provided at the end of the shaft journal 161. An undercut 178 is in front of the second recess 173. As can be seen in FIG. 6a, the snap ring 181, while being radially pre-tensioned, is pre-fitted at the front annular edge 166 of the run-on face 164. The shaft end 161 is slid on in such a way that the snap ring 181 comes to rest against the rear flank 174 of the second recess 173. Thereafter, the snap ring 181 is radially compressed until it engages the first recess 163. Relative to axial movements, the ring is secured in the first recess 163 in flanks 168, 169 by the forces exerted by the flanks 174, 175 of the second recess 173.

Figure 7A:
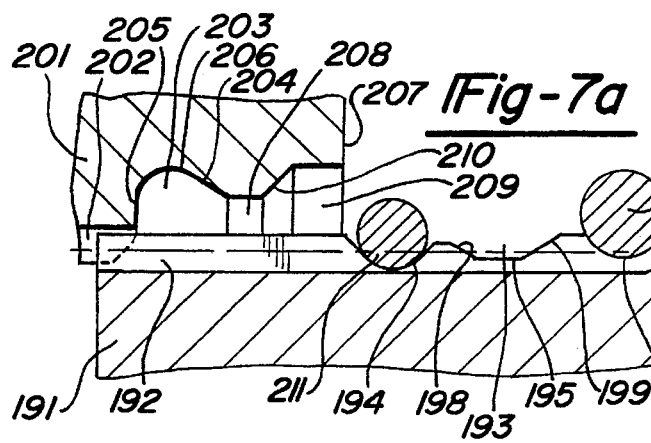
FIG. 7a is a cross sectional view of an assembly according to another embodiment with a first recess in the shaft at the profile run-out at the start of the assembly operation.
Figure 7B:
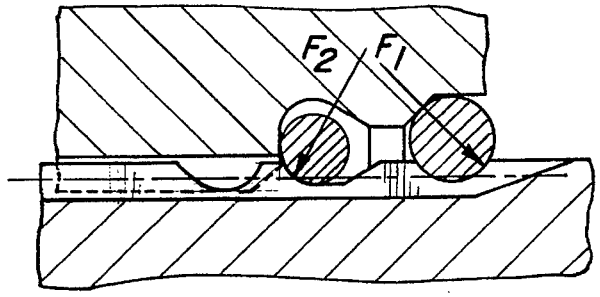
FIG. 7b is a cross sectional view of an assembly according to another embodiment with a first recess in the shaft at the profile run-out in the assembled condition.

In FIG. 7, details which correspond to those shown in FIG. 1 are given reference numbers increased by 180. The details in FIG. 7 substantially correspond to those illustrated in FIG. 1. In particular, a first set of splines 192 with a first recess 193 and a run-on face 194, positioned in front of it, are provided at the shaft end 191. Furthermore, the hub 201 is provided with the second set of splines 202 with the second recess 203. In addition to the details shown in FIG. 1, there is provided a further third recess 213 in the first set of splines 192. If viewed from the shaft end, the third recess 213 is positioned behind the first recess 193. Furthermore, the hub is provided with an inner turned groove 209 whose diameter is greater than the undercut 208. This configuration enables sliding over the snap ring 211. As can be seen in FIG. 7a, the first snap ring 211 is pre-fitted in front of the run-on face 194. The second snap ring 212 is pre-fitted in the third recess 213. When the parts are axially inserted into one another, the first snap ring 211 moves through the undercut 208, rests against the rear flank 204 of the second recess 203 and slides over the run-on face 194 until it engages the first recess 193. The second snap ring 212 in its recess 213 is secured against being slid in further by the forces applied by the rear flank 210. The axial counter-movement is accommodated via the front flank 205 of the second recess 203, with the first snap ring 211 being supported in the first recess 193.

Figure 7C:
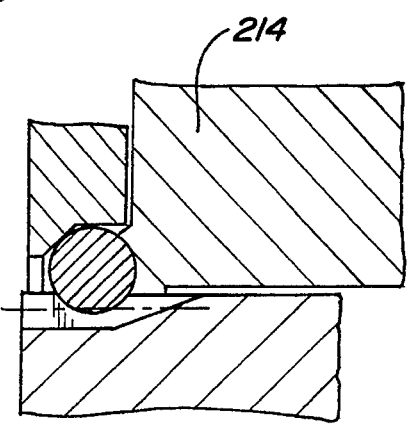
FIG. 7c is a cross sectional view of an assembly according to another embodiment with a first recess in the shaft at the profile run-out together with a holding tool for the second snap ring.

FIG. 7c shows an annular tool 214 which, prior to assembly, receives the shaft and axially supports the second snap ring 212 to ensure that during the assembly of the hub the second snap ring 212 is not destroyed.

Figure 8A:
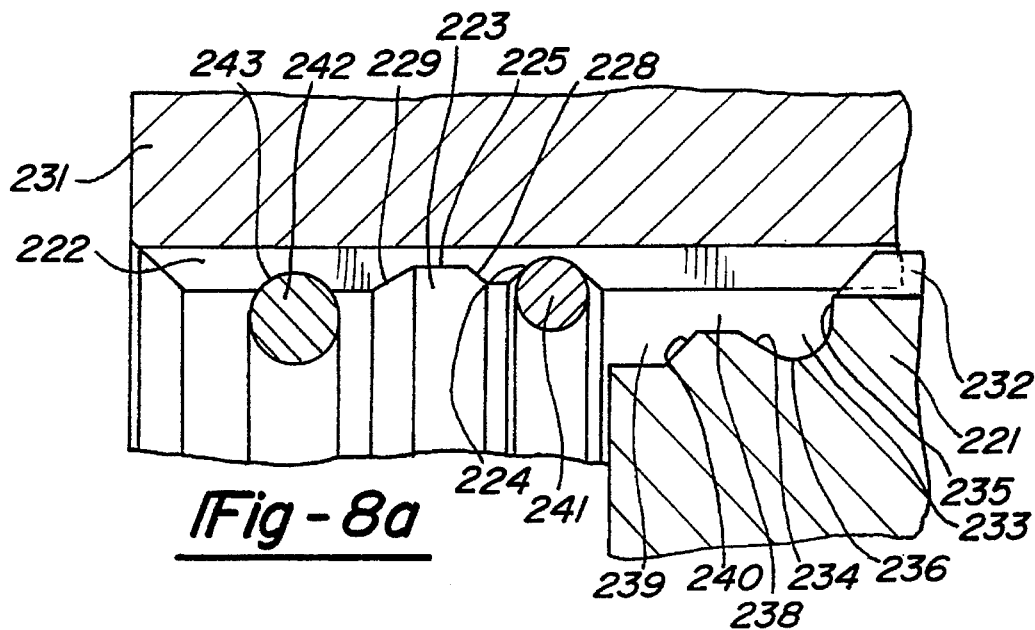
FIG. 8a is a cross sectional view of an assembly according to another embodiment with a first recess in the hub at the rear hub end facing the shaft end at the start of the assembly operation.
Figure 8B:
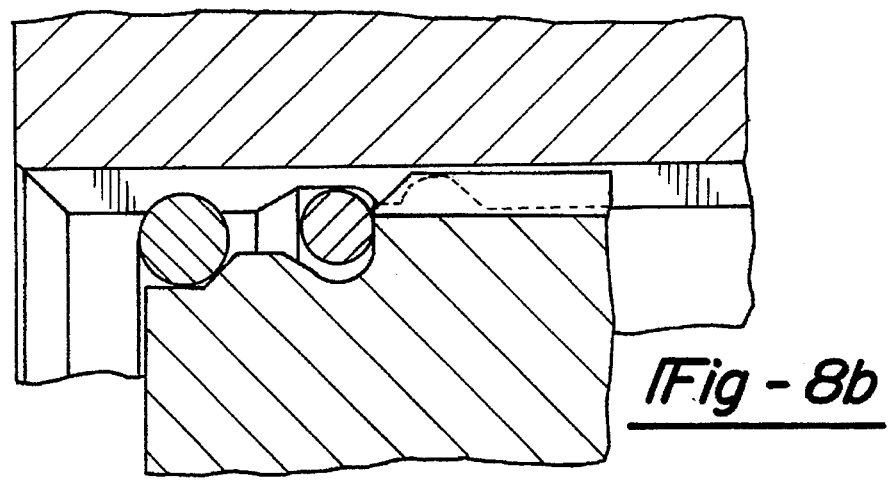
FIG. 8b is a cross sectional view of an assembly according to another embodiment with a first recess in the hub at the rear hub end facing the shaft end in the assembled condition.

In FIG. 8, details which correspond to those shown in FIG. 7 are given reference numbers increased by 30. However, in a kinematic reversal, the first set of splines 222 with the first recess 223 and the run-on face 224 as well as the third recess 243 are provided in the hub 231. The second recess 233 and the turned groove 239, positioned in front of the undercut 238, are arranged at the shaft end 221. As can be seen in FIG. 8a, the first snap ring 241 and the second snap ring 242 are pre-fitted, with radial pretension, in front of the run-on face 224 and in the third recess 243, respectively. During the process of axial insertion, the first snap ring 241 may slide over the undercut 238 until it comes to rest against the rear flank 234 of the second recess 233. It will then slide over the run-on face 224 and engage the first recess 223. At the same time, the second snap ring 242 enters the turned groove 239 and rests against its rear flank 240.

Figure 8C:
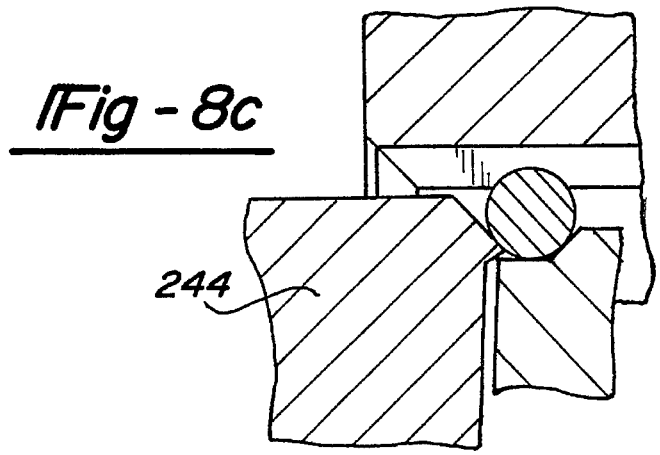
FIG. 8c is a cross sectional view of an assembly according to another embodiment with a first recess in the hub at the rear hub end facing the shaft end together with a holding tool for the second snap ring.

Further insertion is prevented as a result of the second snap ring 242 resting against flank 240 on the hub. Any axial counter-movement is accommodated due to the first snap ring 241 resting against the rear flank 234 of the second recess 233. FIG. 8c shows a tool 244 which is firmly connected to the hub and prevents the hub from being slid further on to the shaft end 221 by resting against the second snap ring 242.

While the above detailed description describes the preferred embodiment of the present invention, the invention is susceptible to modification, variation, and alteration without deviating from the scope and fair meaning of the subjoined claims.

We claim:

1. An assembly comprising:

a driveshaft having an axis and external splines at its shaft end;

a slide-on hub having a shaft bore with corresponding internal splines;

axial securing means in the form of a resilient snap ring engaging opposed recesses in the two sets of splines;

a first recess in one of the first of the two sets of splines form-fittingly engaging the snap ring in a substantially axially clearance-free way, said first recess having a first pair of flanks being inclined with respect to said axis;

a second recess in the second of the two sets of splines providing axial clearance for said snap ring when said snap ring engages said first recess, said second recess having a second pair of flanks being inclined with respect to said axis;

a run-on face on the same of the two sets of splines as said first recess said run-on face being enveloped by a conical face, a conical face having an opening angle, said conical face opening angle, relative to a flank angle of a rear flank of said second pair of flanks of said second recess, is so small that no self-inhibition occurs at the axially loaded snap ring when the shaft and hub are inserted into one another, and said run-on face, with reference to the mutual engagement of the two sets of splines, being positioned in front of the said first recess with said run-on face front annular edge, with reference to the mutual engagement of the two sets of splines, cutting more deeply into said first of two sets of splines than the base of the first recess;

a front flank of said second pair of flanks at the second recess having a flank angle, relative to the flank angles of the first pair of flanks of the first recess, such that said inclined flanks when contacting said snap ring generate self-inhibition at the axially loaded snap ring in both axial directions, thus prohibiting destruction-free detaching of the hub and shaft, with the depth of the second recess being dimensioned such that the snap ring may enter said second recess if, with reference to the first of the two sets of splines, the snap ring is positioned between a rear annular edge of the run-on face and the adjoining shoulder line of said first recess.

2. An assembly according to claim 1, wherein the first of the two sets of splines with the run-on face and the first recess is provided at the shaft end of the driveshaft.

3. An assembly according to claim 2, wherein the run-on face and the first recess are arranged in the region of the profile run-out of the splines.

4. An assembly-according to claim 2, wherein the run-on face and the first recess are arranged at the profile run-in of the shaft end, the surface of the shaft, from its end to the front annular edge of the run-on face being limited or enveloped by a cylindrical face.

5. An assembly according to claim 1, wherein the first of the two sets of splines with the run-on face and the first recess are in the hub.

6. An assembly according to claim 5, wherein the run-on face and the first recess, with reference to the mutual engagement of the two sets of splines, are arranged at the front end of the hub and adapted to slide on and associate with the region of the profile run-out of the second set of splines.

7. An assembly according to claim 5, wherein the run-on face and the first recess, with reference to the mutual engagement of the two sets of splines, are arranged at the rear end of the hub and adapted to slide on and associate with the profile run-in of the shaft end.

8. An assembly comprising:

a driveshaft having an axis and external splines at its shaft end;

a slide-on hub having a shaft bore with corresponding internal splines;

axial securing means in the form of a resilient snap ring engaging opposed recesses in the two sets of splines;

a first recess in one of the first of the two sets of splines with reference to the mutual engagement of the two sets of splines, said first recess having a first pair of flanks being inclined with respect to said axis;

a second recess in the second of the two sets of splines providing axial clearance for said snap ring when said snap ring engages said first recess, said second recess having a second pair of flanks being inclined with respect to said axis;

a run-on face on the same of the two sets of splines as said first recess said run-on face enveloped by a conical face whose opening angle, relative to a flank angle of a rear flank of said second pair of flanks of said second recess, is so small that no self-inhibition occurs at the axially loaded snap ring when the shaft and hub are inserted into one another, and the run-on face, with reference to the mutual engagement of the two sets of splines, being positioned in front of said first recess, said run-on face front annular edge, with reference to the mutual engagement of the two sets of splines, cutting more deeply into said first of the two sets of splines than the base of the first recess;

a front flank of said second pair of flanks at the second recess having a flank angle, relative to the flank angles of the first pair of flanks of the first recess, such that said inclined flanks when contacting said snap ring generating self-inhibition at the axially loaded snap ring when the shaft and hub are pulled apart, thus prohibiting destruction-free detaching of the hub and shaft, the depth of the second recess being dimensioned such that the snap ring may enter the second recess if, with reference to the first of the two sets of splines, the ring is positioned between a rear annular edge of the run-on face and an adjoining shoulder line of the said first recess;

a third recess in the first of the two sets of splines, said third recess form-fittingly accommodating a second snap ring in a substantially axially clearance-free way, and with reference to the mutual engagement of the splines, said third recess is arranged behind the run-on face and the first recess; and a turned end-face groove in the part having the second of the two sets of splines, said second snap ring, with reference to the mutual engagement of the two sets of splines, axially contacting said end-face groove at the rear flank and radially contacting the circumferential face in a clearance-free way, so that further mutual engagement of the two parts is prevented.

9. An assembly according to claim 8, wherein the first of the two sets of splines is provided on the driveshaft and the first and third recesses are positioned at the tooth run-out of the splines.

10. An assembly according to claim 8, wherein the first of the two sets of splines is in the hub and the first and third recesses, with reference to the mutual engagement of the two parts, are at the rear end of the hub.

11. An assembly according to claim 8, wherein the rear flank of the second recess, with reference to the mutual engagement of the two sets of splines, extends in the radial direction.

12. A method of assembling an assembly according to claim 1, wherein the two parts having the two sets of splines are inserted into one another, with the snap ring, while axially supporting itself in the second recess in the part having the second of the two sets of splines sliding over the run-on face in the part having the first of the two sets of splines and engaging the first recess.

13. A method according to claim 12, wherein, prior to axially inserting the two parts into one another, the snap ring, while being radially pretensioned, is applied to the part having the first of the two sets of splines directly in front of the front annular edge of the run-on face where said edge cuts most deeply into the first of the two sets of splines, while the snap ring, via an undercut, is axially inserted into the part with the second of the two sets of splines into the second recess if, with reference to the mutual engagement of the two parts, it is positioned at the front of the respective part.

14. A method according to claim 12, wherein, prior to axially inserting the two parts into one another, the snap ring is introduced radially and in a tension-free way into the second recess in the part having the second of the two sets of splines if, with reference to the mutual engagement of the two parts, it is positioned at the rear of the respective part.

15. A method of assembling an assembly according to claim 8, wherein the first snap ring, while being radially pretensioned, is applied to the part having the first set of splines directly in front of the front annular edge of the run-on face where said edge cuts most deeply into the first of the two sets of splines, inserting the second snap ring, while being radially pretensioned, into the third recess and inserting the two parts into one another, with the first snap ring, while axially supporting itself in the second recess in the part having the second of the two sets of splines, sliding over the run-on face in the part having the first of the two sets of splines and engaging the first recess in the part having the first of the two sets of splines.

16. A method according to claim 15, wherein the part having the first of the two sets of splines is axially supported by an annular tool which directly supports the second snap ring engaging the third recess.

* * * * *

UNITED STATES PATENT AND TRADEMARK OFFICE
CERTIFICATE OF CORRECTION

PATENT NO. : 5,499,884
DATED : March 19, 1996
INVENTOR(S) : Wolfgang Kühnhold, Rudolf Beier It is certified that error appears in the above-indentified patent and that said Letters Patent is hereby corrected as shown below:

Column 8, lines 21-22, Claim 1, please delete "a conical face,"

Signed and Sealed this

Sixth Day of August, 1996

BRUCE LEHMAN

*Attest:*

*Attesting Officer*         Commissioner of Patents and Trademarks